(12) United States Patent
Martinek

(10) Patent No.: US 11,199,129 B2
(45) Date of Patent: Dec. 14, 2021

(54) WASTEGATE SET FOR TURBOCOMPRESSOR AND TURBOCOMPRESSOR FOR INTERNAL COMBUSTION ENGINES

(71) Applicant: Daniel Carmona Martinek, São Paulo (BR)

(72) Inventor: Daniel Carmona Martinek, São Paulo (BR)

(73) Assignee: Daniel Carmona Martinek, Sao Paolo (BR)

( * ) Notice: Subject to any disclaimer, the term of this patent is extended or adjusted under 35 U.S.C. 154(b) by 0 days.

(21) Appl. No.: 16/635,183

(22) PCT Filed: Jul. 18, 2018

(86) PCT No.: PCT/BR2018/000041
§ 371 (c)(1),
(2) Date: Jan. 30, 2020

(87) PCT Pub. No.: WO2019/023768
PCT Pub. Date: Feb. 7, 2019

(65) Prior Publication Data
US 2021/0095592 A1    Apr. 1, 2021

(30) Foreign Application Priority Data
Aug. 4, 2017    (BR) .......................... 102017016845-0

(51) Int. Cl.
*F02B 37/18*    (2006.01)
*F01D 17/10*    (2006.01)

(52) U.S. Cl.
CPC .......... *F02B 37/186* (2013.01); *F01D 17/105* (2013.01); *F05D 2220/40* (2013.01); *F05D 2240/14* (2013.01)

(58) Field of Classification Search
CPC ...... F02B 37/18; F02B 37/183; F02B 37/186; F02B 37/22; F01D 17/105; F05D 2220/40; F05D 2240/14
See application file for complete search history.

(56) References Cited

U.S. PATENT DOCUMENTS 6,976,359 B2    12/2005    Hastings et al.
8,499,432 B2 *   8/2013    Harris ................... F02B 37/186
                                                            29/557

(Continued)

FOREIGN PATENT DOCUMENTS

EP    1249589 B1 *   5/2004    .............. F02B 39/16
WO    2016/074692    5/2016

OTHER PUBLICATIONS

International Search Report for International Application No. PCT/BR2018/000041 dated Sep. 20, 2018.

(Continued)

*Primary Examiner* — Jesse S Bogue
*Assistant Examiner* — Loren C Edwards
(74) *Attorney, Agent, or Firm* — Traverse Legal, PLC

(57) ABSTRACT

A set for turbochargers of internal combustion engines, equipped with mechanical actuators and wastegate flip valve. The set includes in its interior a valve, a valve's arm, a valve's shaft and a bushing, all of which are housed inside a metal casing. The set allows the replacement of the valve and its accessory components way before the end of the turbocharger's life span. Also, a turbocharger adapted for the set, which is provided with an accommodation zone including a bore and a series of fixing gantries cooperating with elements in the face of the set.

7 Claims, 9 Drawing Sheets

(56) References Cited

U.S. PATENT DOCUMENTS

| | | |
|---|---|---|
| 2008/0298953 A1 | 12/2008 | Harris |
| 2013/0202431 A1* | 8/2013 | Heidingsfelder ....... F01D 25/24 415/220 |
| 2014/0271138 A1* | 9/2014 | Markyvech ........... F01D 17/105 415/146 |
| 2015/0292395 A1* | 10/2015 | Dilalan ..................... F16K 1/20 60/602 |
| 2016/0169090 A1* | 6/2016 | Murphy ................ F02B 37/183 415/144 |

OTHER PUBLICATIONS

Written Opinion for International Application No. PCT/BR2018/000041 dated Sep. 20, 2018.

\* cited by examiner

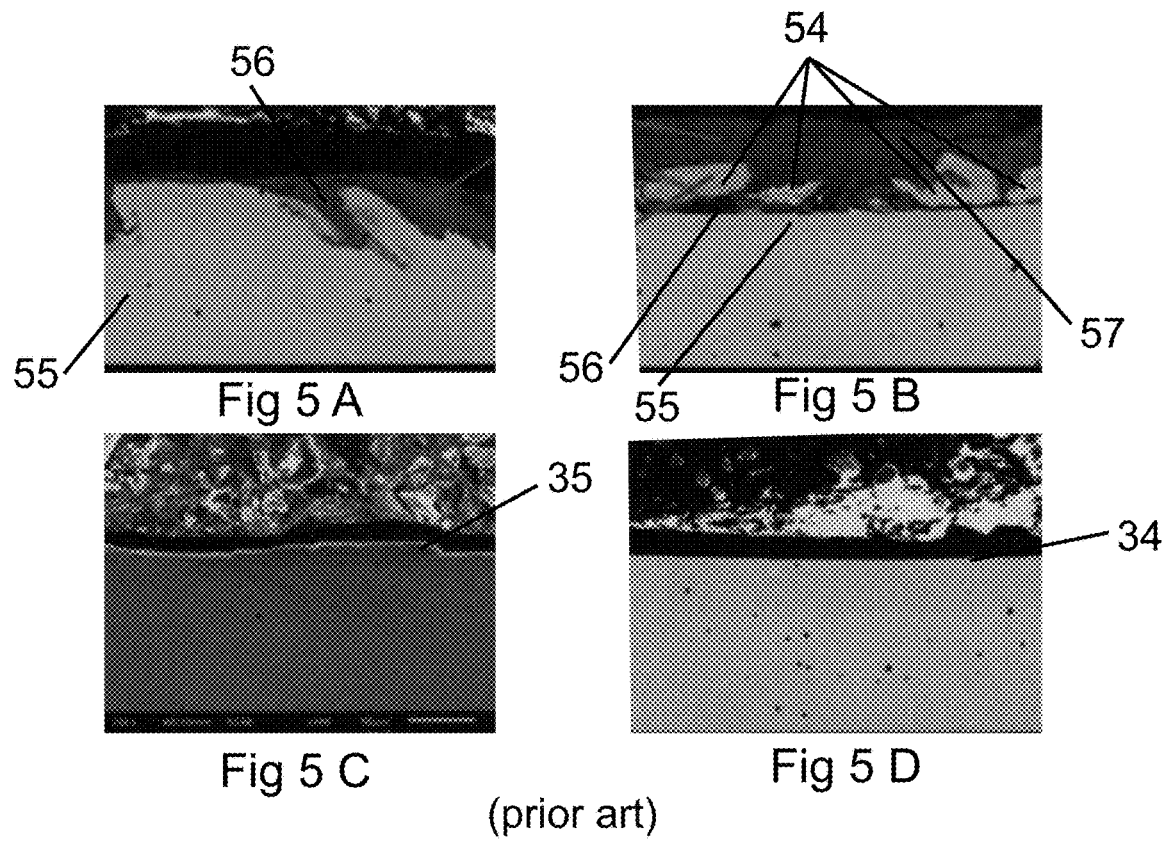
Fig 5 A  Fig 5 B  Fig 5 C  Fig 5 D
(prior art)
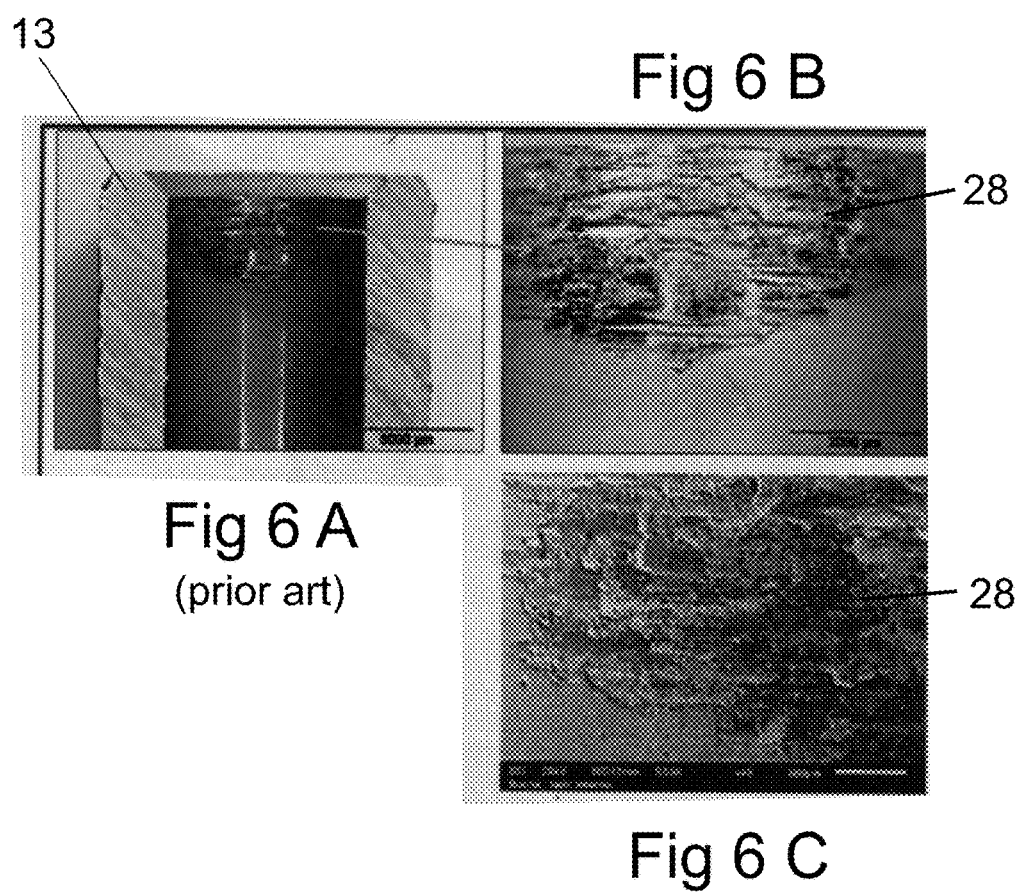
Fig 6 A
(prior art)
Fig 6 B
Fig 6 C

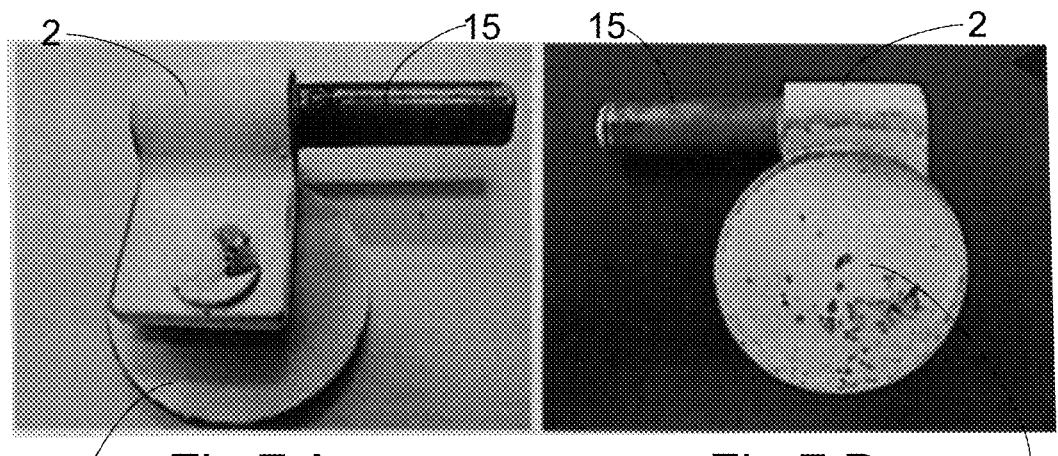
Fig 7 A  (prior art)  Fig 7 B
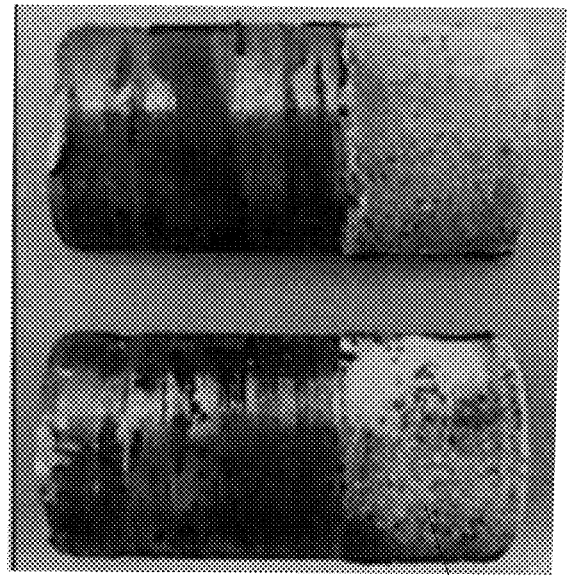
Fig 8 (prior art)
Fig 9 A
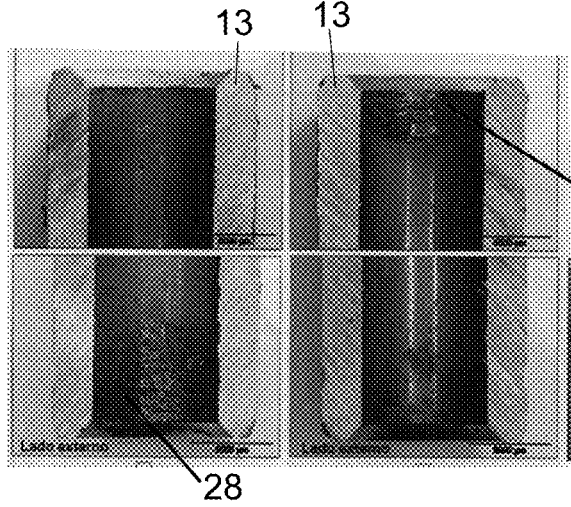
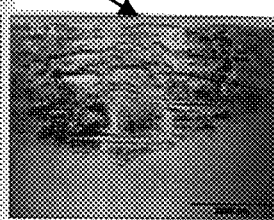
Fig 9 B (prior art)

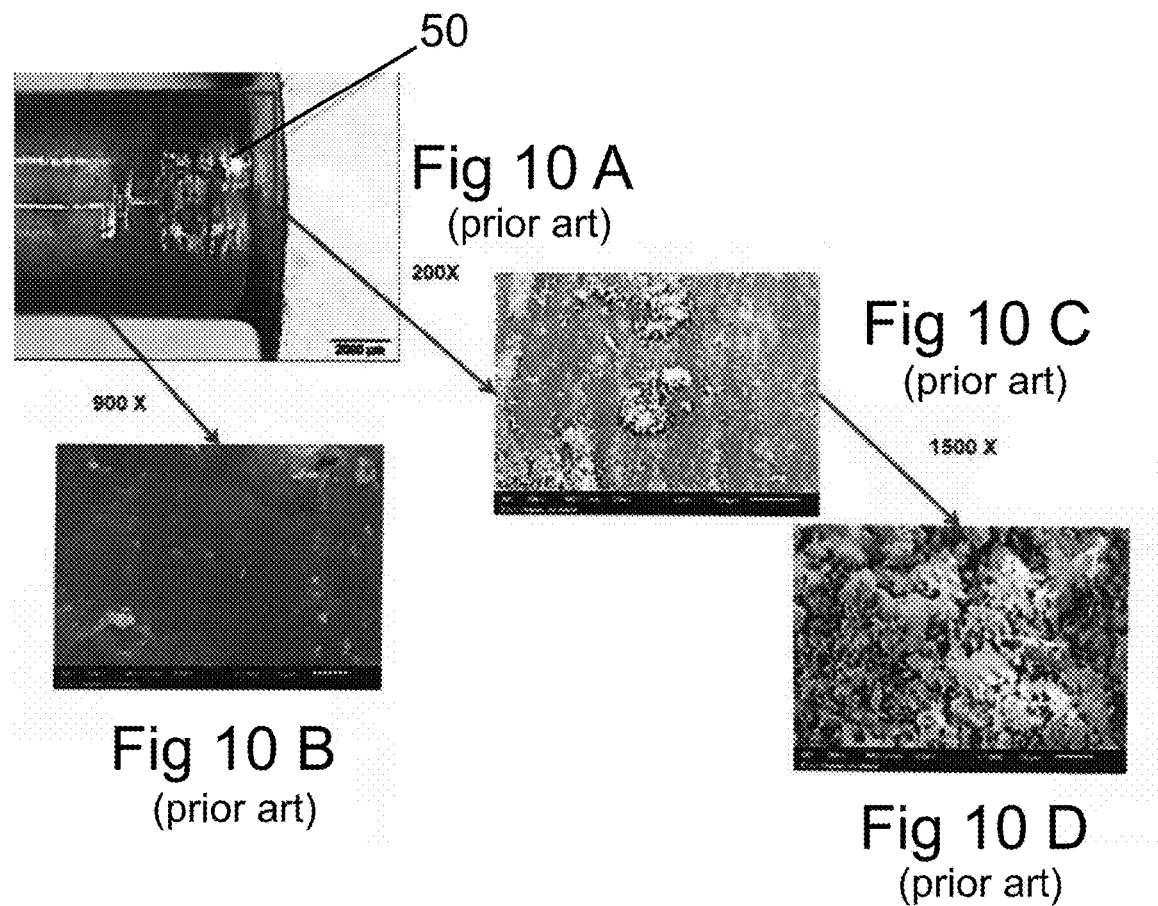
Fig 10 A (prior art)
Fig 10 B (prior art)
Fig 10 C (prior art)
Fig 10 D (prior art)
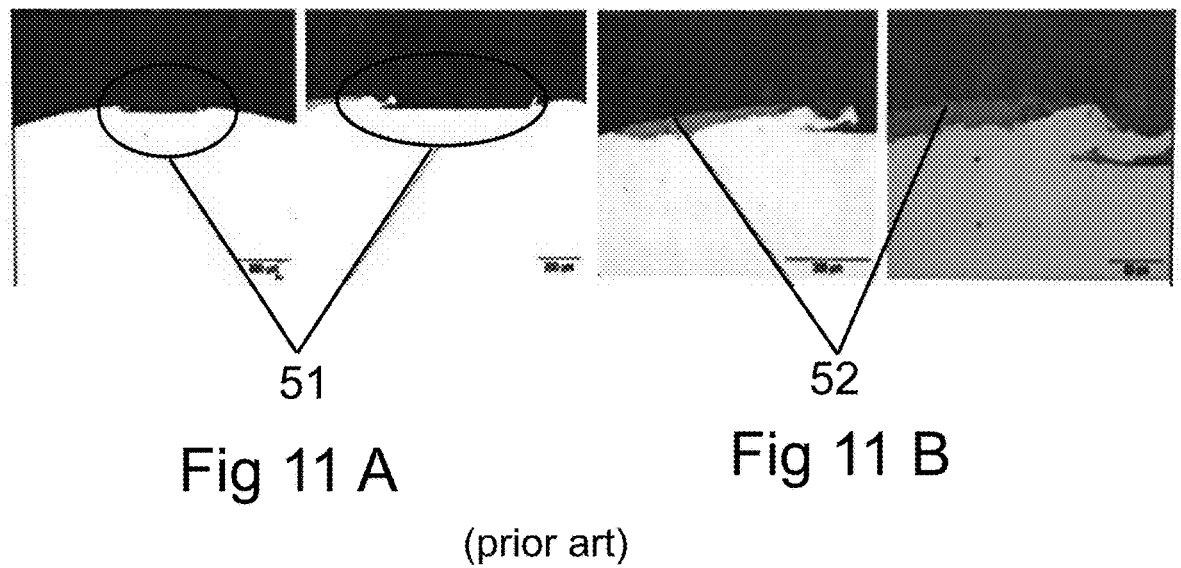
Fig 11 A
Fig 11 B
(prior art)

(present invention)

(present invention)

(present invention)

(present invention)

(present invention)

(present invention)

(present invention)

(present invention)

(present invention)

WASTEGATE SET FOR TURBOCOMPRESSOR AND TURBOCOMPRESSOR FOR INTERNAL COMBUSTION ENGINES

RELATED APPLICATION

This application is an application under 35 U.S.C. 371 of International Application No. PCT/BR2018/000041 filed on 18 Jul. 2018, which claims priority of BR 102017016845-0 filed 4 Aug. 2017; the entire contents of which are incorporated herein by reference.

FIELD OF THE INVENTION

The present invention relates to wastegate valves comprised by turbochargers of internal combustion engines. More precisely, the invention relates to a novel wastegate valve comprised by a new turbocharger.

PRIOR ART DESCRIPTION

A turbocharger 20, as disclosed in FIG. 2 of the present application, is a component comprised by an internal combustion engine, whose objective is to improve combustion conditions, performance, emissions, fuel consumption and engine durability, by increasing the flow and the air pressure inside the cylinders thereof.

The turbocharger 20 invariably works as follows: a turbine 36 is associated with the exhaust of the engine. When the exhaust gas passes through the turbine 36, it rotates an shaft 9 directly associated with a compressor 37. Said compressor 37 is associated with the air intake tubing of the engine. The turbocharger 20 utilizes exhaust gas energy to compress intake air originally under atmospheric conditions into the engine interior.

Therefore, the turbocharger 20 allows an increase in the efficiency of the engine since the increase of the intake air's flow and pressure allows for the fuel flow to be increased as well, resulting in higher values of power and torque. As the combustion conditions are improved with the use of the compressor 20, this implies a reduction in the emissions of polluting gases and a decrease in fuel consumption. The temperatures of some engine components are reduced due to the increase in the air flow, resulting in an increase in their lifespan. Notwithstanding, in high altitude locations, the performance of the engine is not affected by the thin air due to the turbo-feed.

It happens that, when rotating at high speed, the turbocharger 20 may break when certain physical limits are exceeded. Another phenomenon involved in this relationship is the reduced action of the turbocharger 20 when it operates at low revolutions, i.e. without effective action on the turbine 36 to provide compressed air. Such feature, inherent to the engine operating regime and the particularities of other turbo components, may be improved with different choices of internal component combinations (i.e. turbo-matching), thus allowing an improvement in the performance of that equipment when subjected to low revolutions. However, this solution can compromise the whole set when subjected to high speed regimes, far exceeding the physical limits of rotation. This is because the turbine assembly 36 and compressor 37 share a common axis 9, therefore both are directly affected in any operating circumstance, whether at low or high speed.

For this reason, depending on the combination of components used in the turbocharger 20, a pressure relief mechanism is employed to reduce the rotational intensity of the shaft 9 when the turbocharger 20 operates in a high rotation mode. Said mechanism is used to ensure the integrity of the turbocharger 20 when subjected to high rotation regimes while allowing a higher gain in the low rotation regimes.

The most commonly used pressure relief mechanism in the prior art is a wastegate valve 1 (see FIG. 1). Mechanical wastegate valves (the most common model on the market) operates as follows: an actuator 19, which comprises a membrane 10, a cap 7 and a spring 6, drives a rod S when it perceives a pressure sufficiently high to overcome the spring force in the pressurized air inlet 8. The pressurized air inlet 8 communicates with the intake air compressed by the turbo 20. Thus, when the intake pressure is high enough, the actuator rod S moves the wastegate valve 1 (said movement is commonly mediated by a connecting pin 4, a lever 3 and a valve's arm 2). When the wastegate valve 1 is opened, the pressure of the exhaust gas and the intake air (see exhaust gas flow 11) are reduced, the turbine speed 36 is decreased and consequently the rotation of the compressor 37 is reduced. In general terms, that is how a turbocharger 20 with a mechanical actuator 19 and a wastegate valve 1 works.

It happens that, some of the elements comprised by the turbocharger 20 typically have a lifespan shorter than the other parts comprised by this device. Since some of these elements are difficult to access, being made on single-piece casings integrally casted with the other parts of the turbocharger 20, the lifespan of such elements usually determines the overall lifespan of the turbocharger 20.

One of the parts comprising a lower lifespan is the wastegate valve 1 and its associated elements, such as the bushing 13 and the valve's shaft 15.

The lifespan of these elements is greatly affected by the conditions of use and high engine temperatures (directly exposed to exhaust gases). The high temperatures in such location prevents the employment of journals, lubrification, bearings or anything else capable of prolonging the lifespan of these elements. In other words, the tribological relationship of the valve elements 1 and valve's shaft 15 is extremely disadvantaged in this region since it is metal-to-metal friction, without lubrication.

The problem is even greater in Otto cycle motors associated with electric generators, where the wastegate valve movement may be used to control the the electrical grid frequency by influencing the rotation of the motor and the generator's shaft. Thus, the operation of the wastegate 1 valve may occur simultaneously with the accelerator throttle used in Otto cycle engines for the purpose of correcting the frequency of these engines (an unusual solution for Diesel generators, which instead use a variation in fuel injection to control the electrical grid frequency).

FIGS. 5 to 11 show the wear a wastegate valve 1, a valve's shaft 15, and a bushing 13 of a turbocharger 20 are exposed to after a certain period of use. In these figures it is possible to note: within the bushing 13: abrasion grooves 28, at the top end and at the bottom end due to the misaligned working condition between the valve's shaft 15 and the bushing 13 reproduced by the mechanism actuation valve wastegate 1; oxide formations 56 overlying the worn surface 55, metal fragments 54 coated by oxides 57 from subsequent wear on the inner surface of the bushing 13; on the outer face of the valve shaft 15: grooves 50 caused by abrasion, causing the worn surface 51, oxide formations 52 from these wear over the surface of the worn shaft 15; the non-contacting region 34 between bushing 13 and shaft 15 is preserved due to the misaligned movement of the valve's shaft 15 within the bushing 13; failure due to contact 35 in the bushing 13; among other malfunctions.

In order to solve this problem, the short lifespan of the wastegate valve 1, it would be required some modification in the turbocharger 20 that would allow the individual removal of the wastegate valve 1 and associated elements without any damage to the turbocharger 20.

The prior art comprises some wastegate valves 1 of the removable type, however, none of them is suitable to the most commonly used turbocharger model 20, the turbocharger 20 equipped with a mechanical type actuator 19.

US 2014/0271138, for example, discloses a valve having a replaceable electronic actuator, a valve which is much more expensive and complex, and therefore much more unusual than a mechanical wastegate flip valve (see FIG. 1).

Other valves, such as that shown in U.S. Pat. No. 6,976, 359, are not suitable for use in the engines comprised by automobiles (being more suitable for boat engines) since they require an external circuit of by-pass pipes that demand a much larger space for shelter, incompatible with vehicular applications. Besides, this technique prolongs the exhaust circuit to the detriment of the transient response of the engine required in vehicular applications.

Thus, it is necessary to implement a new mechanical wastegate flip valve 1 (the most common wastegate valve 1 used in motor vehicles) that is replaceable, being able to prolong the life span of the turbocharger 20.

OBJECTIVES OF THE INVENTION

The objectives of the present invention are: to provide a solution to the shorter lifespan of the mechanical wastegate flip valve and components associated therewith, allowing an easy replacement of those elements.

BRIEF DESCRIPTION OF THE INVENTION

It is described hereby a wastegate assembly for a turbocharger, comprising a metallic casing, a wastegate valve, a valve's arm, a valve's shaft, a lever, a connecting pin and a bushing is described. Said sleeve is fixed to the inner face of the casing; a first end of the valve's shaft is housed within the bushing; the valve arm communicates the wastegate valve to the second end of the valve shaft; and the valve's shaft crosses one side of the metal casing; the lever interfaces between the end of the valve's shaft passing through the casing and said connecting pin. The wastegate assembly comprising means for temporarily securing its structure to the outer face of a turbocharger.

Also disclosed is a turbocharger for internal combustion engines comprising an accommodating region for a wastegate assembly provided with at least one aperture and at least one mounting gantry compatible with the temporary attachment means of the assembly defined above.

BRIEF DESCRIPTION OF THE DRAWINGS

FIG. 5—magnified microscopic views of the inner contact surface of a longitudinal sectional section of a bushing comprised among the accessory elements of the wastegate valve of the prior art.

FIG. 6—internal detail of the bushing comprised among the accessory elements of the prior art wastegate valve.

FIG. 7—details of a wastegate valve of the prior art associated with the valve's arm and the valve's shaft: FIG. 7A—upper view of the valve; FIG. 7B—view of the contact face of the valve.

FIG. 8—external detail of the bushing comprised between the accessory elements of the wastegate valve of the prior art.

FIG. 9—cross-sectional view of the bushing comprised among the accessory elements of the wastegate valve revealing in detail the malfunctions on the inner surface of the bushing.

FIG. 10—external view of the valve shaft (FIG. 10A) and magnified microscopy of the shaft surface (10B to 10D).

FIG. 11—magnified microscopy view of the external surface of the valve shaft.

FIG. 1S—is a side view of the wastegate valve assembly of the invention in its first embodiment.

DETAILED DESCRIPTION OF THE INVENTION

Figure 1:
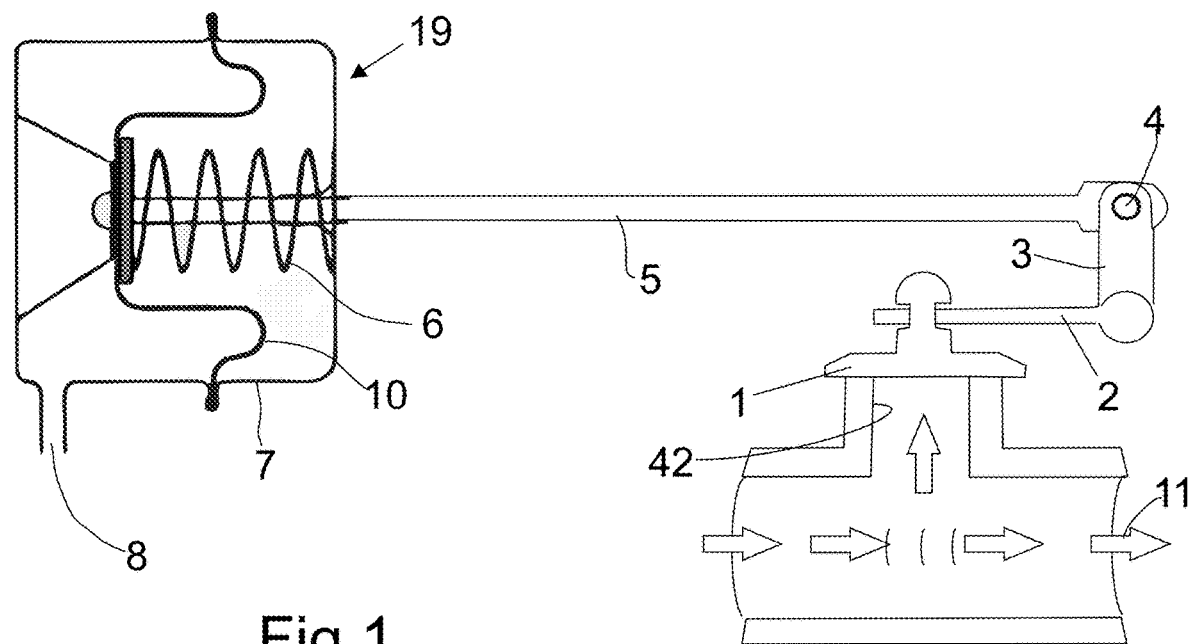
FIG. 1—cross-sectional view of a wastegate valve of the prior art associated with a mechanical actuator.
Figure 2:
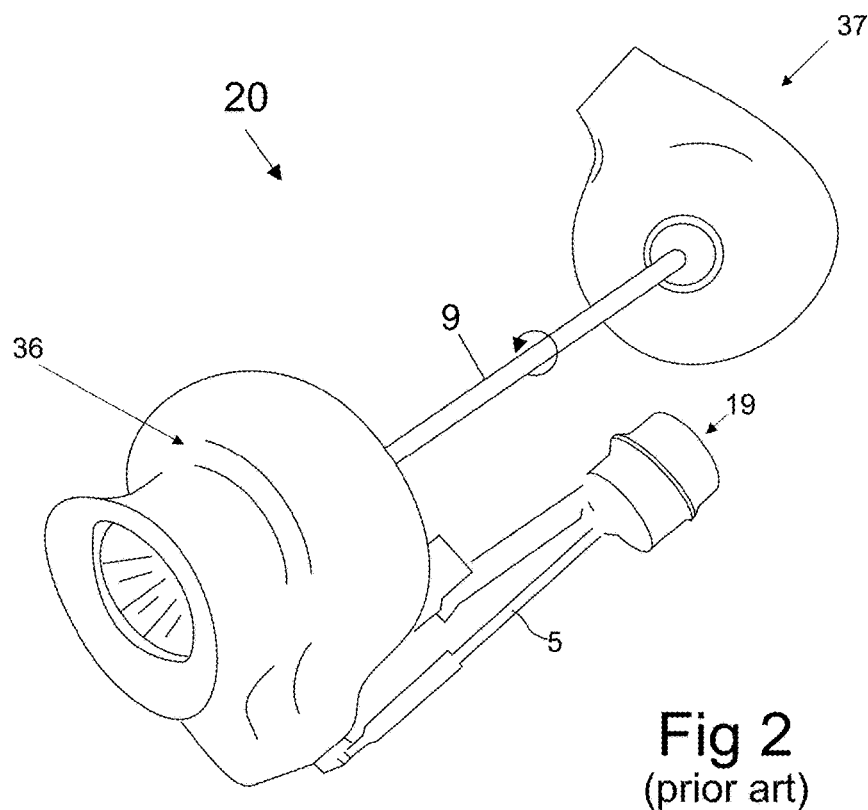
FIG. 2—top perspective view of a turbocharger of the prior art.
Figure 3:
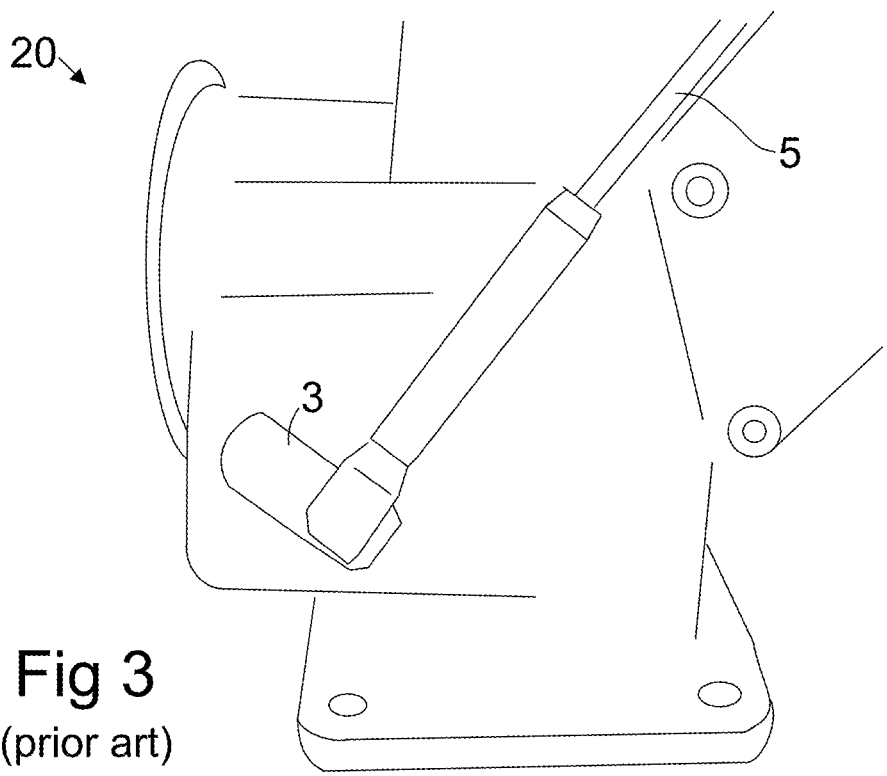
FIG. 3—side view of a detail comprised by the turbocharger of the prior art.
Figure 4:
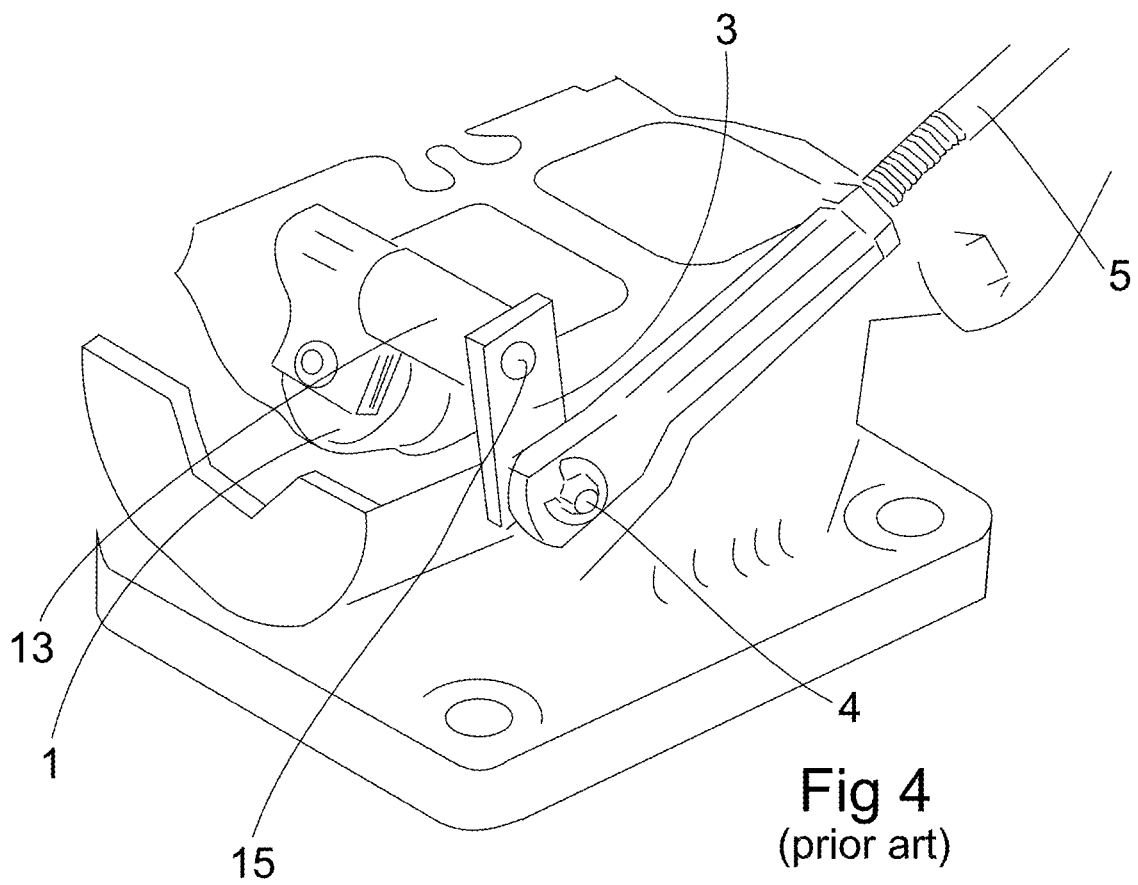
FIG. 4—cross-sectional view of a turbine comprised by a turbocharger of the prior art revealing the arrangement of a wastegate valve therein.
Figure 12:
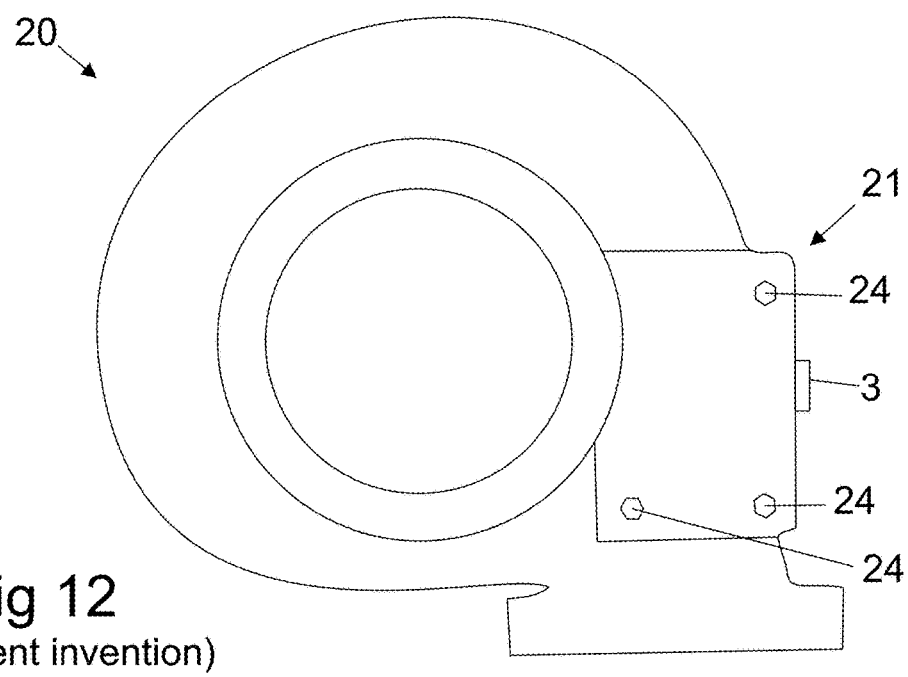
FIG. 12—front view of the turbocharger of the invention comprising the removable wastegate valve.

The present invention, as disclosed in FIGS. 12 to 20, consists of a wastegate valve set 21 (hereinafter "set 21") for the mechanical wastegate flip valve 1 (said "flip valve" constituting a valve which operates with angularity, being provided with a pivotal support) associated with the turbine 36 comprised by a turbocharger 20 adapted to said set 21.

Said set 21 comprises a casing 25, a flip valve type wastegate valve 1, a valve's arm 2, a valve's shaft 15, a bushing 13, a lever 3 and a connecting pin 4. The bushing 13 is fixed to the inner face of the casing 25; a first end of the valve's shaft 15 is received within the bushing 13; the valve's arm 2 communicates the wastegate valve 1 to the second end of the valve's shaft 15; the valve's shaft 15 traverses one side of the metal casing 25 and its portion passing through the side of the metal casing 25 is associated with a bore comprising the lever 3; a second bore comprising the lever 3 houses the connecting pin 4. This is the basic configuration of the set 21.

The purpose of said set 21 is to allow replacement of the wastegate valve 1 and its accessory components (valve's shaft 15, bushing 13, valve's arm 2, lever 3 and connecting pin 4) before the end of the lifespan of the turbocharger 20.

The set 21 of the invention may comprise different means capable of permitting association to the outer shell of the turbine 36. Ideally, the attachment between the set 21 and the turbine 36 is secured, preventing any inadvertent separation between the turbine housing 36 and the set 21 and which is also simple and quick to execute, facilitating its replacement by any inexperienced staff in charge of this job.

Figure 13:
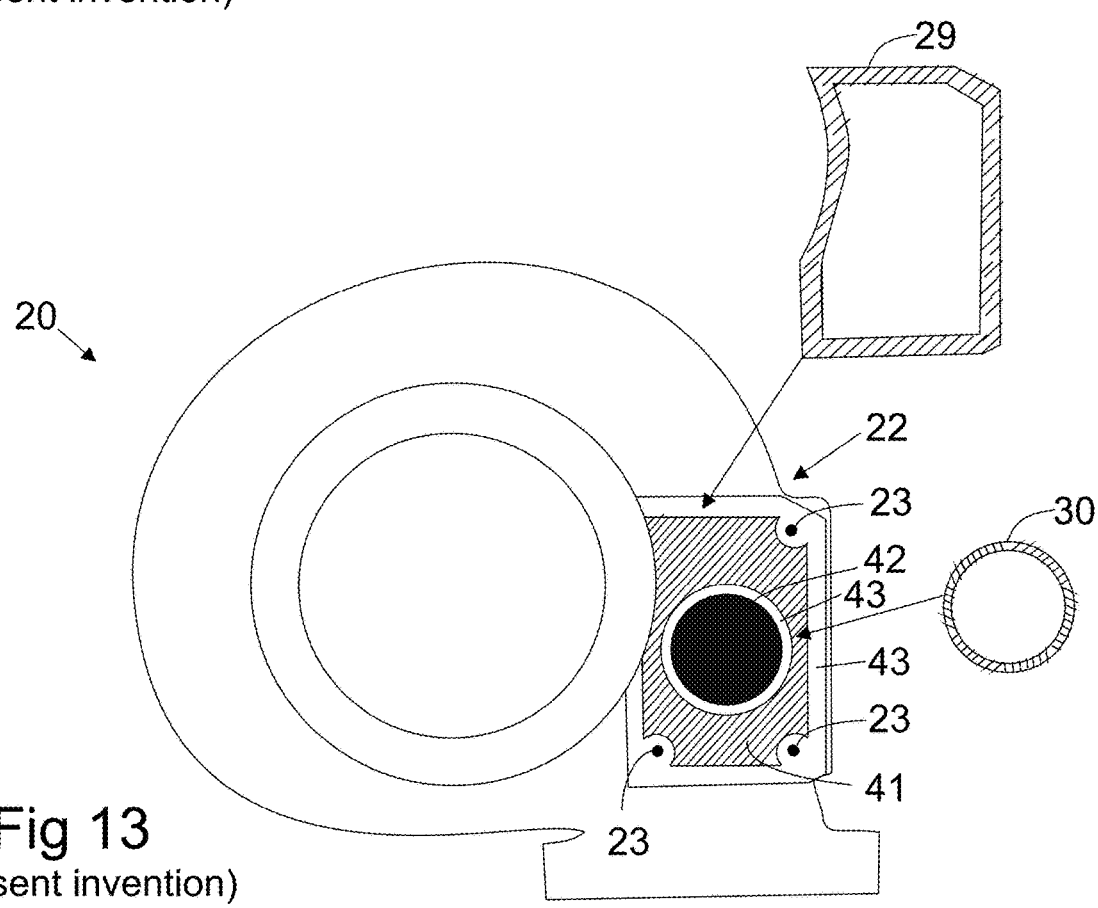
FIG. 13—front view of the turbocharger of the invention without the removable wastegate valve.
Figure 14:
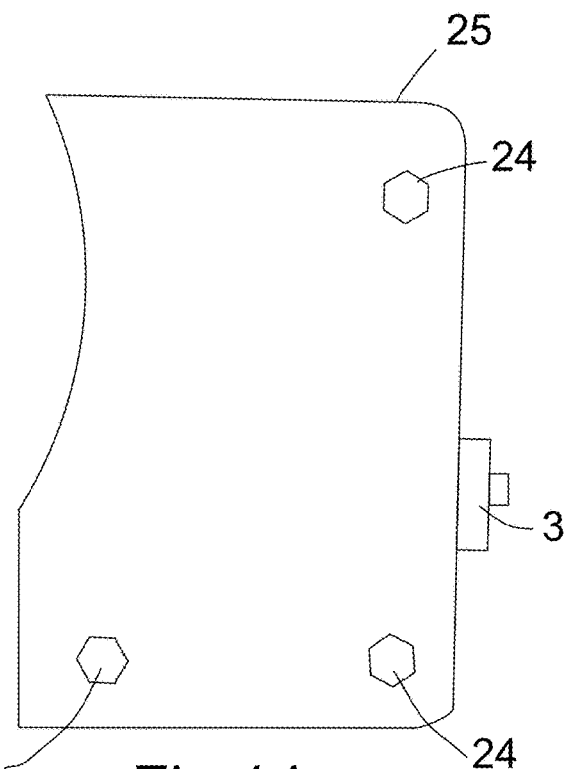
FIG. 14—frontal view of the wastegate valve assembly of the invention in a first embodiment.
Figure 15:
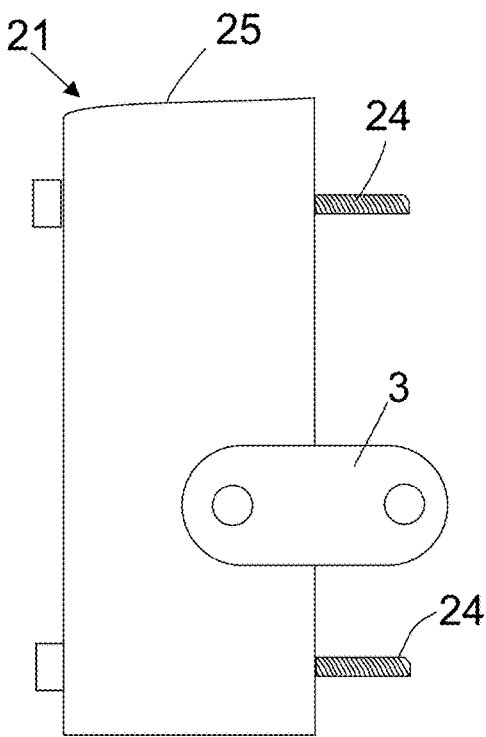
Figure 16:
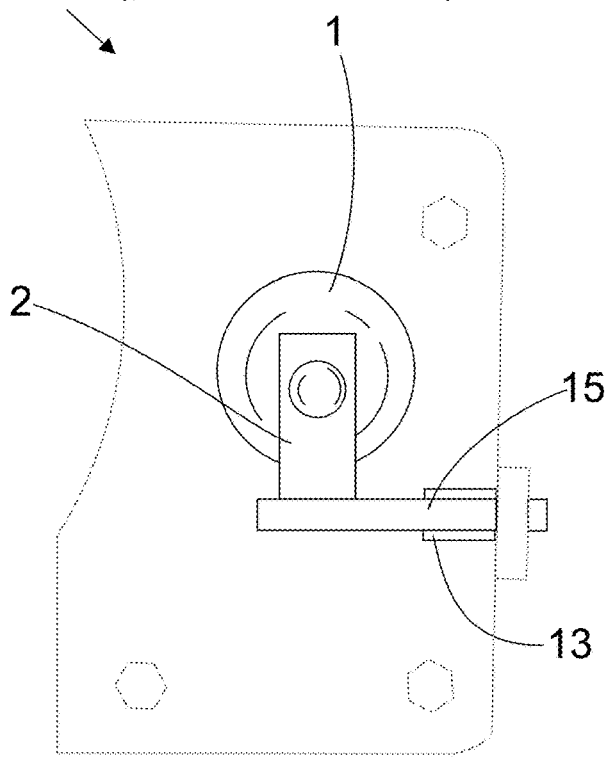
FIG. 16—front view of the wastegate valve assembly of the invention of FIG. 12 revealing the wastegate valve in its interior.
Figure 17:
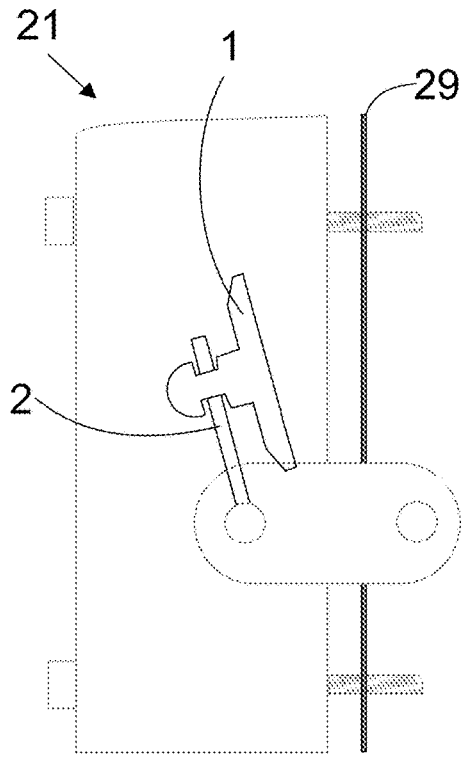
FIG. 17—side view of the wastegate valve assembly of the invention of FIG. 13 revealing the wastegate valve in its interior.
Figure 18:
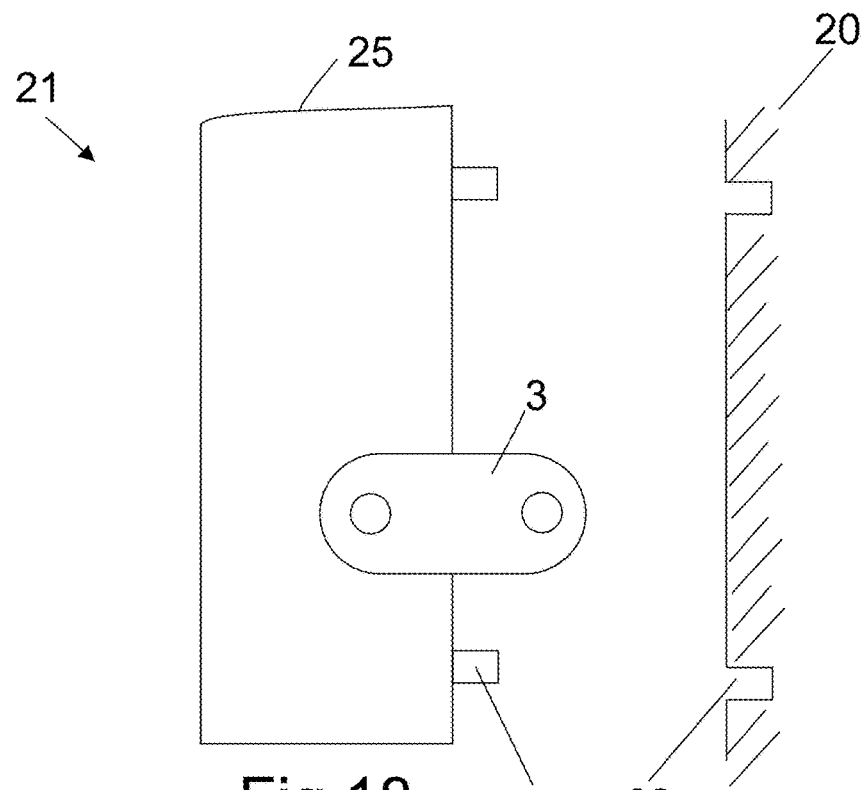
FIG. 18—side view of the wastegate valve assembly of the invention in a second embodiment.

Preferably, the present invention follows the configuration of FIGS. 14 and 15 as the means of association. In these figures, there is disclosed a configuration comprising three access screws 24 which pass through the casing structure 25 and are housed in the threaded holes 23 comprised in the structure of the turbocharger 20 (see FIG. 13) more precisely next to the turbine 36. Preferably, a gasket 29 or 30 is disposed at the contact interface between the metal casing 25 and the turbine housing 36 positioned over the joint accommodating region 43. Said gasket 29, 30 is preferably manufactured in the same materials as the exhaust manifold (alternatively comprising the same materials forming the cylinder head's gasket or the gasket used in the assembly of the turbocharger in the exhaust manifold), preferably comprising a ductile metal, capable of sealing any imperfection existing between the surfaces of the casing 25 and the casing of the turbine 36 and withstand the high temperatures and expansion of these elements caused by the exhaust gases.

The gasket 29, 30 may be an outer gasket 29 (see FIG. 13) which accompanies the entire outer perimeter of the casing 25, or may be an inner gasket 30, i.e. a metal seal ring, which accompanies the valve bore 42.

Alternatively, the following fitting configurations of the set 21 are indicated:

(i) flat rails 33 on the contact face of the set 21 (see FIG. 18) associated with flat grooves 38 comprised on the outer face of the turbocharger 20. In this configuration, it is to be understood that the attachment between flat rail 33 and flat groove 38 is effected by interference fit, i.e. on the pressure caused by the tight fit between the outer surface of the flat rail 33 and the inner surface of the flat groove 38.

Figure 19:
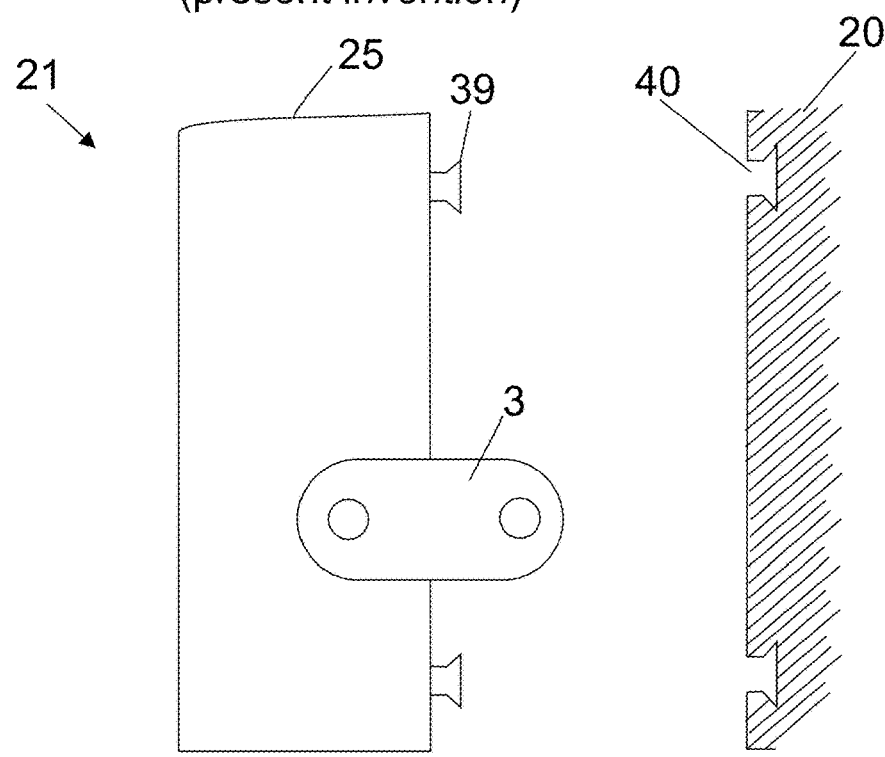
FIG. 19—side view of the wastegate valve assembly of the invention in a third embodiment.

(ii) beveled rails 39 present at the contact face of the set 21 associated with beveled grooves 40 present on the outer face of the turbocharger 20 (see FIG. 19). In this configuration, interference fit is not required, however, it improves the performance if a side latch is used (a clamp, a bolt or a pivoting bar) to prevent inadvertent displacement of the set 21 during movement of the vehicle's engine.

Figure 20:
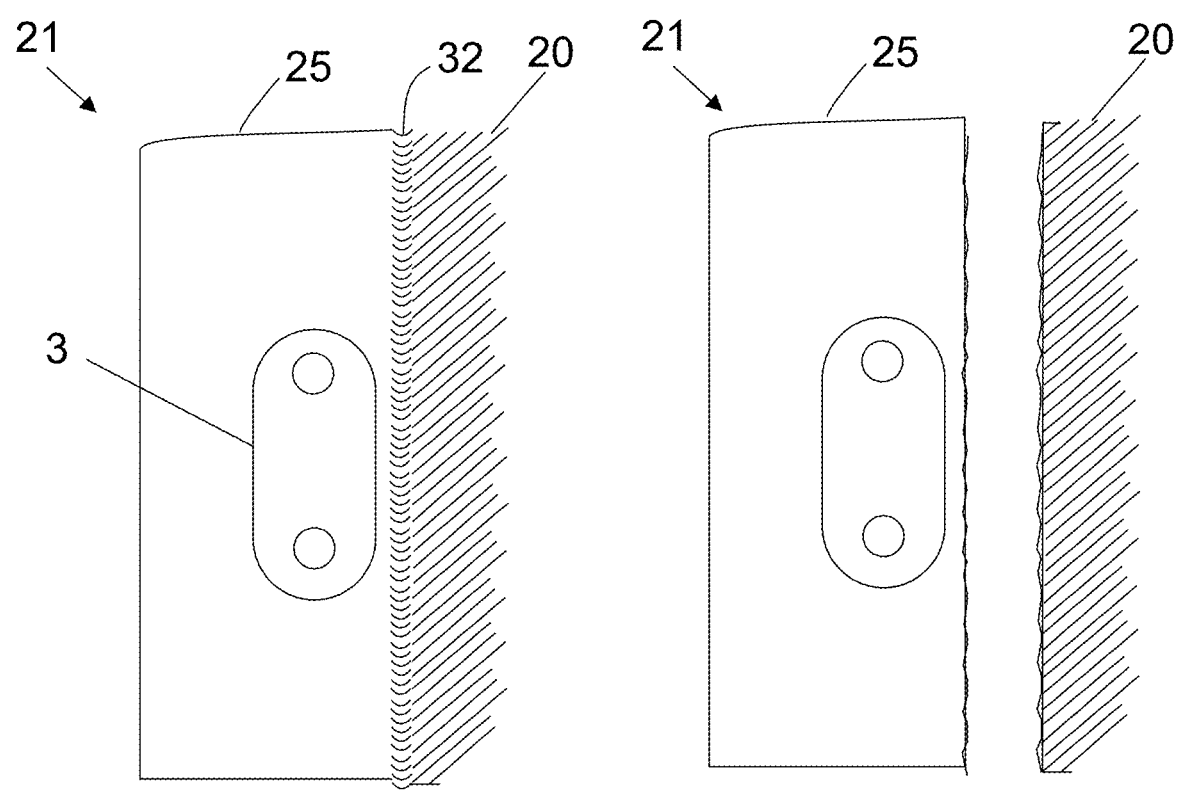
FIG. 20—side view of the wastegate valve assembly of the invention in a fourth embodiment.

(iii) anchoring by weld bead 32 or weld points between the contact face of set 21 and the outer face of turbocharger 20 (see FIG. 20). In this configuration, the work for removal of set 21 is much higher, and to do so it is required a special machinery suitable for separating the two structures.

(iv) snap-fit attachment by providing male snap-fit protrusions on the inner face of the set 21 and female housings cooperating with said protrusions on the outer face of the turbocharger 20 (not disclosed in the figures).

Preferably, the metal casing 25 is manufactured in a metal casting process, comprising in its own structure a bushing 13 (casted within the same process). The bushing 13 extends from the casing structure 25 itself, housed in the bore through which the valve's shaft 15 penetrates. Still according to the preferred embodiment of the invention, the valve 1, the valve's arm 2 and the valve's shaft 15 are configured in a single piece (simultaneously casted in the same casting cavity) and are made by means of a lost wax casting process.

The set 21, preferably (but not mandatory), comprises a mechanical or electronic sensing means capable of alerting the malfunction or the need for its replacement. Said malfunction sensors are known in the state of the art and comprise: vibration sensors, end stop, infrared, pressure, temperature, among others. As an example, an infrared sensor combined with an end stop sensor could identify a situation of partial occlusion of the valve, alerting with a lamp in the panel of the vehicle or the motor (if it is not automotive), or by a code of error in the engine's electronic module or vehicle indicating a malfunction or need to change the set 21.

Another sensing means utilizing solenoids and end stop sensors arranged within the actuator could identify a mechanical strength or loosening in the movement of the actuator arm 5, which would signal for premature wear or tear of the valve's shaft 15 at bushing 13.

A third means of sensing would be an engine's malfunction sensor, which would lead to a diagnosis of the set 21.

Of course, it is not enough to provide a set 21 without providing a way of adapting the turbocharger 20 to said set 21. Therefore, the present invention comprises a new turbocharger model 20 (see FIGS. 12 and 13) revealing an accommodation zone 22 disposed in the turbine housing 36, said accommodation zone 22 being provided with a bore 41 and a series of fixing frames 23, 38, 40 which cooperate with the fixing mechanisms provided on the set's 21 contact face (such as shown in FIG. 13), the smooth grooves 38 or beveled grooves 40 (shown in FIGS. 18 and 19), the grooved grooves 38, female accommodation for snap-fit locks, or any other means of receiving and securing the set 21. The accommodation zone 22 preferably comprises at least one gasket accommodating region 43, defined as a smooth surface, of considerable thickness, which cooperates with the inner face of the gaskets 29, 30.

It is noteworthy that the present invention achieves all the objectives it proposes to achieve by providing a solution to the shorter lifespan of the wastegate valve 1 and its accessory components.

This advantage allows a number of end-user benefits, such as: an economy in vehicular maintenance for owners of engines and/or vehicles; the possibility of using the wastegate valve movement 1 not only to relieve the pressure of the turbocharger 20 but also to control instabilities in the rotation of the crankshaft of an Otto cycle engine (which is already done today in some engines employed by electric generators) and can be used in strategic controls of increase and/or performance management under conditions of rotation and/or torque/power variation.

Having described some preferred embodiments of the invention, it is to be noted that the scope of protection provided by this document encompasses all other alternative forms applicable to the implementation of the invention, which is defined and limited only by the content of the claims.

The invention claimed is:

1. A wastegate set for a turbocharger of an internal combustion engine, wherein the wastegate set comprises a metallic casing, a wastegate flip valve, a valve arm, a valve shaft, a bushing, a lever and a connecting pin; the bushing being secured to an inner face of the metallic casing; a first end of the valve shaft lodging within the bushing; the valve arm communicating the wastegate flip valve to a second end of the valve shaft; the valve shaft traversing a side of the metallic casing; the lever interfaces between the first end of the valve shaft through the metallic casing and the connecting pin; said wastegate set comprising a means for temporarily securing a structure of the wastegate set to an outer face of the turbocharger, wherein the means for temporarily securing is a plurality of beveled rails on the metallic casing, and wherein the plurality of rails are associated with a plurality of grooves on the outer face of the turbocharger.

2. The wastegate set for the turbocharger of the internal combustion engine, according to claim 1, wherein the metallic casing comprises the bushing defined in one piece with the structure of the metallic casing.

3. The wastegate set for the turbocharger of the internal combustion engine, according to claim 1, wherein the valve, the valve arm and the valve shaft are configured in one piece.

4. The wastegate set for the turbocharger of the internal combustion engine, according to claim 1, wherein the wastegate set comprises an automatic sensing means indicating a malfunction of the wastegate set and a need for replacement of the wastegate set.

5. The wastegate set for the turbocharger of the internal combustion engine, according to claim 1, wherein the wastegate set comprises the lever, in association with the first end of the valve shaft that emerges out of the metallic casing.

6. The wastegate set for the turbocharger of the internal combustion engine, according to claim 1, characterized in that the wastegate set comprises a gasket, configured to interface the outer face of the turbocharger and an inner edge of the metallic casing.

7. A turbocharger for internal combustion engines comprising:
 a wastegate set comprising:
  a metallic casing, a wastegate flip valve, a valve arm, a valve shaft, a bushing, a lever and a connecting pin;
  the bushing is secured to an inner face of the metallic casing; a first end of the valve shaft is lodged within the bushing; the valve arm communicates the wastegate flip valve to a second end of the valve shaft; the valve shaft traverses a side of the metallic casing; the lever interfaces between the first end of the valve shaft through the metallic casing and the connecting pin; said wastegate set comprising a means for temporarily securing a structure of the wastegate set to an outer face of the turbocharger, wherein the means for temporarily securing is a plurality of beveled rails on the metallic casing, and wherein the plurality of rails are associated with a plurality of grooves on the outer face of the turbocharger; and
 a housing region for the wastegate set provided with at least one opening and at least one fixing gantry compatible with the means for temporarily securing of the wastegate set.

* * * * *